United States Patent Office 3,235,603
Patented Feb. 15, 1966

3,235,603
REACTIONS OF ORGANO BORANE COMPOUNDS
Kenneth J. Murray, Elizabeth, and Stanley B. Mirviss,
Westfield, N.J., assignors to Esso Research and Engineering Company, a corporation of Delaware
No Drawing. Filed Dec. 27, 1961, Ser. No. 162,565
11 Claims. (Cl. 260—606.5)

This invention relates to the use of novel catalysts for certain reactions wherein trialkylborane is converted to dialkylboron hydride as an intermediate or end product. More particularly this invention relates to reactions of trialkylborane compounds in the presence of nickel or platinum containing catalysts to effect a rapid conversion of the trialkylborane reactant to a dialkylboron hydride. Still more particularly this invention relates to such reactions as (1) catalytic decomposition of trialkylborane to form a dialkylboron hydride, (2) isomerization reactions wherein an isoalkylborane is converted to a normal alkylborane, and (3) displacement reactions wherein an alkylborane is reacted with an olefin to obtain a new alkylborane having alkyl groups corresponding to the olefin reactant and olefins corresponding to the alkyl groups attached to the initial alkylborane reactant.

For ease of discussion borolanes, i.e. compounds of the following structure

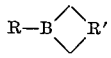

wherein R' represents a branched or straight chain aliphatic residue bonded to the boron atom through two different carbon atoms and R is an alkyl radical or hydrogen, will be referred to herein and included by the term trialkylborane or dialkylboron hydride. A typical borolane is represented by the following formula

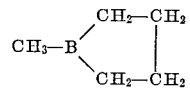

Organo boron chemistry has taken on an important role in the synthesis of olefins. It has particular importance in the conversion of internally double bonded olefins to normal alpha olefins which are in today's commercial market more desirable than other isomers. Through organo boron chemistry it is possible to convert an internally double bonded normal olefin, i.e., a normal non-alpha olefin to a normal alpha olefin by first forming tri-sec-alkylborane, heating said tri-sec-alkylborane under certain conditions to obtain tri-n-alkylborane which can then be (1) decomposed to obtain normal alpha olefin, or (2) reacted with another olefin in a displacement type reaction to generate n-alpha olefin and form a new trialkylborane compound having alkyl groups corresponding to the olefin employed in the displacement reaction. To further illustrate, butene-2 may be reacted with a boron compound to form tri-sec-butylborane which in turn may be isomerized to form tri-n-butylborane. The tri-n-butylborane may be decomposed to liberate butene-1 or it may be reacted with another olefin, e.g., butene-2 to liberate butene-1 and reform tri-sec-butylborane. In essence, therefore, the trialkylborane isomerization reaction referred to can be followed either by the displacement reaction or a decomposition reaction. One major economic drawback to the aforesaid reactions has been the lengthy time required in order to obtain appreciable yield of product and the relatively high temperature requirements for the decomposition, displacement and isomerization reactions.

It is an object of this invention to provide the aforesaid alkylborane reactions with a novel catalyst system to substantially increase the reaction rates.

It is another object of this invention to provide a novel catalyst system for these reactions wherein a substantially lower reaction temperature may be employed. It is still another object of this invention to provide a novel catalyst system which will permit a higher yield of the desired product. These and other objects of this invention will be further clarified by the more detailed description of the process which follows.

In order to better understand the present invention, reference may be hade to the following equilibrium equations:

I—Isomerization

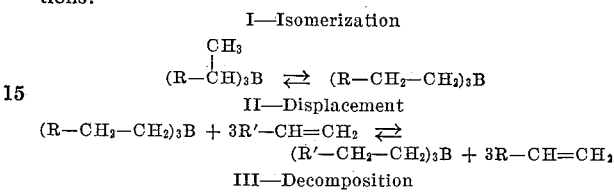

II—Displacement

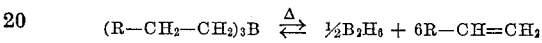

III—Decomposition $$(R-CH_2-CH_2)_3B \stackrel{\Delta}{\rightleftarrows} \tfrac{1}{2}B_2H_6 + 6R-CH=CH_2$$

wherein R and R' represent alkyl radicals. It is to be understood that while equilibrium Equations I-III show the reaction going to completion, in many cases the reaction will or can be made to stop at some intermediate product. For example, in Reaction I less than all of the alkyl radicals may be isomerized. In Reaction II less than all of the alkyl radicals may be displaced or in Reaction III less than all of the alky radicals may be split off. Using Reaction III as an example the product may be (RBH$_2$), (R$_2$BH), or as shown ½ (B$_2$H$_6$).

Insofar as Reaction I is concerned, the specific mechanism is not fully understood. However, it is believed that the isomerization mechanism initially involves a splitting off of a secondary or tertiary alkyl group as in decomposition to obtain as an intermediate a dialkylboron hydride. There subsequently occurs a single or series of re-additions of the olefin to the dialkylboron hydride, wherein the boron moves down the alkyl chain until it is bonded to a terminal carbon atom of the olefin resulting in a primary alkyl radical. Similarly, in the displacement reaction the trialkylborane is initially converted to a dialkylboron hydride intermediate which in the presence of the displacing olefin forms the new trialkylborane with the substituted alkyl group. The dialkylboron hydride is an intermediate in the isomerization and displacement reactions and is one of the end products of the decomposition reaction as noted previously, and therefore if the conversion of trialkylborane to dialkylboron hydride can be accelerated, then the isomerization and displacement reactions can be accelerated at least to this extent. It is theorized that the conversion of trialkylborane to dialkylboron hydride is the slowest portion of the isomerization and displacement reactions.

The alkylboranes which serve as reactants for the above reactions are well known in the art and comprise trialkylboranes having from 2 to 30 carbon atoms per alkyl group. The alkyl groups may be the same or different in molecular weight and/or structure. They may be straight chain or highly branched although these reactions are most meaningful from a commercial viewpoint when employing n-alkylboranes in the decomposition and displacement reactions and sec-alkylboranes in the isomerization reaction. Additionally, tertiary alkylboranes may be converted to isoalkylboranes via the above routes.

Typical examples of trialkylboranes which may serve as reactants include triethylborane, tripropylborane, tri-n-butylborane, tri-n-hexylborane, tri-n-octylborane, tri-n-ndecylborane, tri-n-dodecylborane, and so on up to C$_{30}$ alkylboranes. In addition, the examples of mixed boranes include ethylbutylhexylborane, dibutylhexylborane, dioctyldodecylborane and so forth with almost any combination of alkyl radicals possible. Instead of primary alkyl groups there may be employed tri-sec-alkylboranes wherein the alkyl groups are attached to the boron atom through a secondary carbon atom. Additionally, tertiary alkyl groups are also employable. Triarylboranes, diarylalkylboranes and aryldialkylboranes may be employed. In all cases the alkyl may contain from 2 to 30 carbon atoms although obviously four carbon atoms is minimum for a tertiary alkyl group and three carbon atoms is minimum for a secondary alkyl group. The alkyl group may also be cyclic, e.g., cyclopentyl. Further, the alkyl groups may differ with respect to their branchiness and their primary, secondary or tertiary nature. For example, n-butyl-sec-isoamyl-tert-butylborane is a borane having primary, secondary and tertiary alkyl groups of mixed branchiness.

The boralanes as noted have the following structure

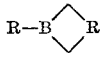

and the following nomenclature is illustrative:

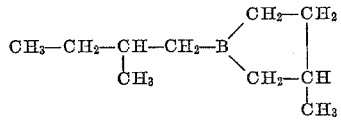

The aforesaid examples of alkylborane reactants are but a few of the alkylboranes which may be employed.

For the isomerization reaction, the alkyl radicals of the borane will preferably be normal or branched secondary or tertiary radicals which upon isomerization will convert to the primary alkyl groups as evidenced by Reaction I above.

For the displacement reaction, the alkylborane reactant will be determined by the end products desired. Thus, tri-n-hexylborane reacted with hexene-2 should yield hexene-1 and tri-sec-hexylborane and/or tri-n-hexylborane depending on the reaction temperature. Other displacement reactions will be apparent from this example.

Temperatures employable for the decomposition, isomerization and displacement reactions will to a large extent be dependent on the particular trialkylborane employed. However, in general, for the decomposition reaction a temperature in the order of 25 to 500° C. and preferably 160 to 260° C. may be employed. For the isomerization reaction a temperature of 50 to 215° C., and preferably 100 to 175° C. may be employed, and for the displacement reaction a temperature of 25 to 215° C., and preferably 100 to 165° C. may be employed.

In the decomposition reaction there may be employed pressures of from 0.01 mm. Hg to 6000 p.s.i.g., and preferably 0.1 mm. Hg to 3000 p.s.i.g. and in general these pressure ranges are applicable to the isomerization and displacement reactions. Decomposition is preferably carried out in an inert atmosphere such as with the use of an inert gas, e.g., nitrogen, methane, $CO_2$, etc. Isomerization and displacement reactions on the other hand are usually carried out in liquid phase and the use of non-atmospheric pressures is not required. In the case of the very light olefins, it may be desirable to carry out the displacement reaction under a partial pressure of the displacing olefin. However, this choice will largely be dependent on the molar ratios of reactants selected. The process may be effected with or without a diluent.

The only reactant necessary for the decomposition and isomerization reactions as evidenced by Reactions I and III shown above is the alkylborane compound. The displacement reaction, Recation II, requires an olefin reactant in addition to the alkylborane and since this reaction is reversible, the molar ratios of olefin to trialkylborane reactant are important. They may vary between 1 to 1 and 20 to 1. These reactions may be carried out in several stages or in one stage, continuously or batchwise.

It is important to note that the isomerization and displacement reactions may be effected concomitantly in the same reaction zone since the conditions for both reactions are about the same. As an example, reference is had to the following reaction:

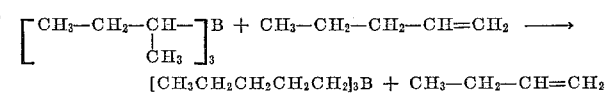

As evidenced by this reaction the sec-butyl radicals are isomerized to primary butyl radicals and are then displaced to form the products noted. This involves both isomerization and displacement.

The catalyst of this invention comprises nickel and/or platinum in their elemental state or in the form of an organic or inorganic compound and unsupported or supported in either state. Good results have been obtained by the use of elemental nickel in subdivided form, and excellent results have been obtained employing elemental nickel in colloidal form. Colloidal nickel or platinum may be added as such or formed in situ. This can be accomplished by adding to the reaction mixture the metal in the form of metal acetylacetonate, e.g., nickel acetylacetonate, or similar compounds, which react or decompose under reaction conditions to form elemental nickel.

The nickel containing catalyst may comprise an inorganic salt such as nickel sulfate, nitrate, phosphate, cyanide and borohydride. The halides such as nickel chloride, bromide, iodide, and the like are also useful. Additionally, salts of organic acids such as nickel acetate, propionate, butylate, benzoate, and the like, are also effective catalysts for the above reactions. In addition to the inorganic and organic salts nickel complexes of chelating compounds such as the Versenes, e.g., ethylene diamine tetraacetic acid, nickel salicylates, nickel acetoacetate, and the like may be employed. The corresponding compounds of platinum and cobalt are also within the scope of this invention as catalysts for the alkylborane reactions referred to above. In the case of platinum there may also be employed platinum alkyl and/or platinum aryl compounds. Whichever metal is chosen as the active catalyst, the compound or metal itself may be supported on a conventional carrier such as alumina, silica, silica-alumina, kieselguhr, pumice, clays, charcoal and the like. The ratio of active metal to support is not important insofar as this invention is concerned to the extent that the support is not a catalyst poison and does not inhibit the reaction mechanism. The active metal must of course be present in sufficient quantity to catalyze the reaction mechanism involved Preferably there will be employed from 0.001 to 15 wt. percent of catalyst as active metal based on boronalkyl reactant, more preferably 0.05 to 10 wt. percent will be employed.

As previously noted, colloidal nickel and/or platinum appear to be the most active forms of the catalyst. This particular form of catalyst may be effected by decomposition of the metal compounds referred to above during or prior to the reaction. For example, if desired, the colloidal nickel and/or platinum may be preformed and injected into the reaction zone as such. Somewhat less effective but still an excellent catalyst is elemental nickel and/or platinum in a finely divided form, i.e., having an average particle size in the range of 50–200 mesh. Coarser particles of the element such as 4–16 mesh size are markedly less effective but still highly active as catalyst for the alkylborane reactions referred to herein.

Corresponding cobalt or platinum containing compounds may be employed if desired, but nickel or platinum are preferred.

To demonstrate the vastly superior results obtainable in the decomposition reaction with the catalysts of this invention, reference may be had to the following examples:

*Example 1*

A 250 ml. two-necked round bottom flask equipped with a thermometer well and distillation apparatus was charged with 0.2 mole of tri-2-methylbutylborane (59.5 cc., 45.2 gms.) and .02 mole (1.17 gms.) of 200 mesh particle size nickel. The reaction was carried out at reflux temperatures, 235°–205° C. for 10 hours, taking overhead isopentenes. There was obtained 12.8 gms. (91.5 mole percent yield) of a mixture of isopentenes (87.5% 2-methyl-2-butene).

*Example 2*

Following the above procedure, .200 mole of tri-2-methylbutylborane was thermally decomposed in the presence of .02 mole of nickel acetylacetonate. This latter material decomposed during the reaction to produce colloidal nickel. The reaction was carried out for 7 hours at a temperature of 170 to 240° C. without reflux. During this run .319 mole of isopentylenes distilled off.

The extremely high efficiency of the catalyst employed may be best appreciated by reference to Table I below which compares this decomposition reaction without catalyst to the same reaction employing both colloidal and 200 mesh nickel.

TABLE I

| Run # | Moles of Tri-2-Methyl-butylborane | Catalyst | Temp., °C. | Time, Hrs. | Yield of C$_5$ olefin,[1] Mole percent |
|---|---|---|---|---|---|
| 1 | .2 | 0 | 238–208 | 20 | 93 |
| 2 | .2 | (²) | 236–205 | 10 | 91.5 |
| 3 | .2 | (³) | 170–231 | 7 | 159 |

[1] Yield based on the decomposition of one boron-carbon bond.
² .020 mole of 200 mesh Ni.
³ .02 mole of colloidal Ni.

It is evidenced from the above table that employing generally the same temperatures, the 200 mesh nickel catalyst was capable of decreasing reaction time required for a 90+% conversion to about one-half and employing colloidal nickel added in the form of nickel acetylacetonate, the run time was further decreased. The reaction time required for 159 mole percent yield was one-third that required for the 93 mole percent yield obtained without the catalyst, i.e., even more than one boron-compound bond is broken.

To illustrate the applicability of the present catalyst to the isomerization and displacement reactions, reference may be had to the following examples:

*Example 3*

In a 250 ml. two-necked round bottom flask equipped with a thermometer and reflux condenser, 0.20 mole of tri-sec-butylborane is heated with 1.8 gms. of 50 mesh nickel. On distillation, tri-n-butylborane is obtained in good yield.

*Example 4*

A 500 ml. round bottom flask equipped with a thermometer, stirrer and distillation apparatus is charged with 0.20 mole of tri-4-methylpentylborane, 0.6 mole of 1-dodecene and 2.0 gms. of 200 mesh platinum. The reaction is heated and 4-methylpentene-1 is obtained in good yield.

*Example 5*

A 500 ml. round bottom flask, equipped with a thermometer, stirrer, pressure equalized separatory funnel and distillation apparatus is charged with 0.30 mole of tri-sec-octylborane and 3 gms. of nickel acetylacetonate. The mixture is heated and 2-octene is added dropwise via the funnel, as 1-octene is taken overhead.

What is claimed is:

1. In a process for converting a trialkylborane compound to a dialkylboron hydride compound by subjecting said trialkylborane compound to elevated temperatures, the improvement which comprises employing in the reaction a nickel containing catalyst.

2. In a process for decomposing trialkylborane wherein said alkyl groups contain from 2 to 30 carbon atoms each and wherein said trialkylborane is heated at a temperature between 25 to 500° C. for a time sufficient to obtain substantial quantities of dialkylboron hydride, the improvement which comprises employing in said reaction a nickel containing catalyst.

3. A process for isomerizing a trialkylborane wherein at least one of the alkyl groups is non-primary which comprises heating said trialkylborane reactant at a temperature between 50 to 215° C. for a time sufficient to convert said non-primary alkyl group to a primary alkyl group, the improvement which comprises employing in said reaction a metal containing catalyst, said metal being selected from the group consisting of nickel and platinum.

4. A process in accordance with claim 3 wherein said metal is nickel.

5. A process in accordance with claim 3 wherein said metal is platinum.

6. In a process for obtaining alpha olefins from trialkyl borane compounds containing non-primary alkyl groups wherein said trialkylborane is heated at a temperature between 25 to 215° C. in the presence of an olefin for a time sufficient to isomerize non-primary alkyl groups of said trialkylborane to primary alkyl groups and for an additional time sufficient to displace at least some of said primary alkyl groups and to generate alpha olefins corresponding in structure to said primary alkyl groups, the improvement which comprises employing in said reaction a metal containing catalyst, said metal being selected from the group consisting of nickel and platinum.

7. A process in accordance with claim 6 wherein said metal is nickel.

8. A process in accordance with claim 6 wherein said metal is platinum.

9. A process for converting an organo borane having three non-olefinic hydrocarbon radicals attached to the boron atom, to an organo boron hydride having two non-olefinic hydrocarbon radicals attached to the boron compound which comprises subjecting said organo borane compound to elevated temperatures in the presence of a nickel containing catalyst.

10. A process in accordance with claim 9 wherein said nickel containing catalyst is finely divided nickel.

11. A process in accordance with claim 10 wherein said nickel is present in colloidal form.

References Cited by the Examiner

UNITED STATES PATENTS 2,781,410   2/1957   Ziegler et al. _____ 260—683.15
2,938,926   5/1960   Goller et al. _____ 260—606.5
3,180,881   4/1965   Zosel et al. _____ 260—606.5 X TOBIAS E. LEVOW, *Primary Examiner.*

LEON D. ROSDOL, *Examiner.*